Oct. 12, 1965  W. M. MENDEZ  3,210,938
PRESSURE OPERATED VALVE
Filed Aug. 20, 1962
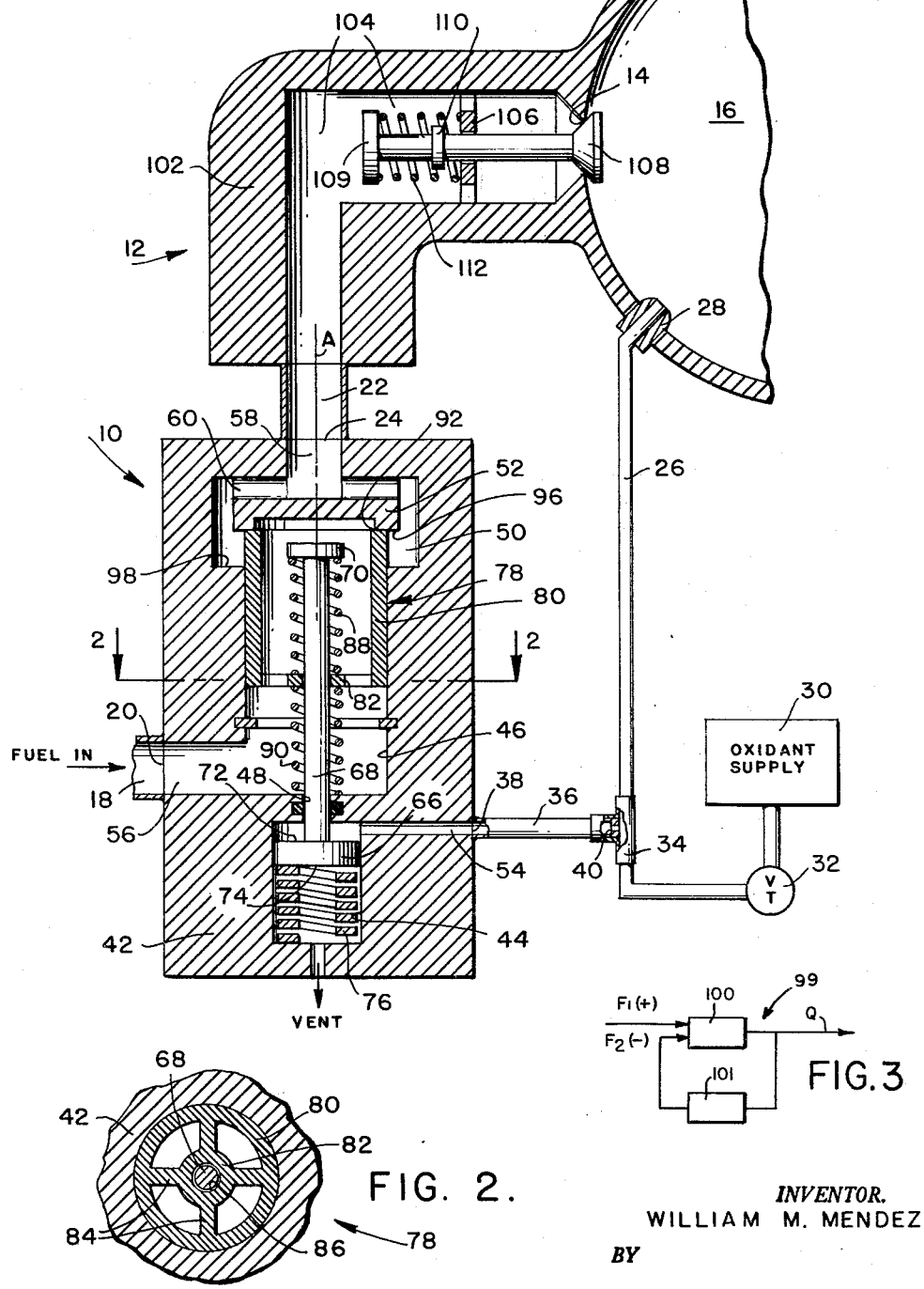
INVENTOR.
WILLIAM M. MENDEZ
BY
ATTORNEY.

United States Patent Office 3,210,938
Patented Oct. 12, 1965

3,210,938
PRESSURE OPERATED VALVE
William M. Mendez, Princeton, N.J., assignor, by mesne assignments, to the United States of America as represented by the Secretary of the Navy
Filed Aug. 20, 1962, Ser. No. 218,188
4 Claims. (Cl. 60—39.27)

The present invention relates to a liquid propellent rocket motor and more particularly to such a motor in which thrust may be controlled over a wide range to provide desired operational control at all times and under all intended operating conditions. The improvement of the invention relates more particularly to the fuel to oxidant proportioning control for the motor. The invention also relates to pressure operated valves.

The inherent simplicity and positive action of pressure operated valves has prompted various attempts to employ such mechanisms to proportion rate of delivery of the liquid propellants introduced into a rocket combustion chamber. The delivery pressure of a first propellant is employed as a control pressure which controls a metering valve to regulate the flow of the second propellant to maintain a predetermined ratio of flow of the propellants.

These attempts, however, have thus far met failure, principally because the transient fluctuations in combustion chamber pressure, that are due to the inherent instability of the combustion processes, transmitted into the supply lines of the propellant used for pressure control. The pressure responsive metering valve, in turn, causes the flow of the controlled propellant to fluctuate, which tends to regeneratively reinforce combustion instability. This causes rough rocket unit operation or destructive oscillation. Accordingly, the elimination of regenerative oscillations in propellent feed systems employing pressure controlled metering valves has been a serious problem prior to the present invention.

Furthermore, when certain propellants are used, it is important that an oxidant lead be achieved on starting, and an oxidizer override be maintained during shutdown, to avoid explosions at these times. The oxidizer lead prevents the accumulation of large amounts of fuel before initial combustion takes place. The oxidant override assures complete burning of any fuel remaining in the combustion chamber at and during the shutoff of the motor.

Accordingly, an object of the present invention is to provide a liquid propellent rocket motor readily adapted for use over relatively wide thrust ranges and in which effective control of the proportion of liquid propellants delivered to the rocket motor is obtained without regenerative oscillations due to fluctuations in combustion chamber pressure.

Another object is to provide a valve for controlling fuel flow in a rocket motor operatively responsive to oxidant delivery pressures in which: (a) a substantially constant mixture ratio of propellants is maintained at all feed rates, (b) regenerative oscillations due to combustion instability is eliminated, and (c) oxidizer lead on starting and oxidizer override during shutdown is provided.

Other objects, features and many of the attendant advantages of this invention will become readily appreciated as the same become better understood by reference to the following detailed description when considered in connection with the accompanying drawings wherein:

FIG. 1 is a central section of a pressure operated metering valve in accordance with the present invention, shown employed in conjunction with a propellant feed system for a rocket motor unit, FIG. 2 is a section taken along line 2—2 of FIG. 1, and FIG. 3 diagrammatically depicts the negative feedback force acting during operation of the valve of FIG. 1.

Referring now to the drawing and in particular to FIG. 1 thereof, a rocket motor unit comprises a liquid fuel control valve 10, and a fuel injector head 12 having an outlet 14 leading into a rocket combustion chamber 16. A fuel supply line 18 delivers liquid fuel from a source (not shown) to a fuel inlet port 20 of control valve 10, and another fuel supply line link 22 communicates the fuel from an outlet port 24 of control valve 10 to an inlet port of injector head 12. Also leading into combustion chamber 16 is a liquid oxidant delivery line 26, which communicates with the interior of combustion chamber 16 through a fixed area injector nozzle 28 of any suitable design. Oxidant is furnished to delivery line 26 from a source 30 of liquid oxidant through a conventional control valve or throttle 32, by which flow of oxidant may be started, stopped, or selectively varied. Interposed in oxidant delivery line 26 intermediate control valve 32 and injector 28 is a T-tap 34, having its tap outlet connected through a control pressure line 36 to a control pressure inlet port 38 of valve 10. The size of orifice 40 of the tap outlet of T-tap 34 is chosen to be sufficiently small relative to the transverse area of oxidant delivery line 26 that the static pressure in delivery line 26, but not the dynamic pressure, is transmitted to control pressure line 38. It will be apparent that the instantaneous static pressure in delivery line 26 is essentially the pressure of source 30 minus the pressure drop across control valve 32. Since the drop across valve 32 decreases as the valve is opened, the static pressure in oxidant delivery line 26, and therefore the pressure in control line 36, increases with increase in the flow rate of fuel through line 26.

Fuel control valve 10 comprises a body 42, and formed therein in alignment about a common axis A are a piston bore 44 and a valve bore 46. Bores 44 and 46 are joined by a co-axial bore 48 of reduced diameter. The upper end of valve bore 46 opens to a head chamber 50 of enlarged diameter. A co-axial boss 52 formed from the body 42 projects downwardly into the head chamber. Bores 44, 46, 48 and head chamber 50 form the valve body elements for receiving a piston and valve mechanism to be hereinafter described. A lateral passage 54 communicates control pressure inlet 38 with the zone adjacent the upper end of piston bore 44, and another lateral passage 56 communicates fuel inlet port 20 with the lower end of valve bore 46. The outlet port 24 is also aligned about axis A and a central passage 58 extends downward therefrom into boss 52, terminating short of the lower face of the boss. A plurality of smaller passages 60 extend radially outwardly from the lower end of central passage 58 and open and communicate with the head chamber 50. Head chamber 50, boss 52, radial passages 60, and central passage 58 form a fuel outlet arrangement for the valve.

The piston and valve mechanism, above referred to, comprises a piston 66 which slideably engages piston bore 44. Piston 66 has a stem 68 which slideably and sealingly reciprocates in bore 48 and projects into valve bore 46. A collar 70 is formed on the end of stem 68 projecting into valve bore 46, for reasons to become hereinafter apparent.

The upper end of piston bore 44 forms a hydraulic pressure chamber and the static pressure of oxidant in delivery line 26 is transmitted thereto through lateral passage 54 for application against the upper face 72 of piston 66. Disposed between the lower face 74 of piston 66 and the lower end of piston bore 44 is a relatively heavy compression spring which serves to oppose the force of oxidant pressure on piston 66, and is so chosen to provide desired calibration of piston movement under various oxidant pressures. Disposed in valve bore 46 is a slide valve member 78, FIG. 1 and FIG. 2, comprising a tubular portion 80 having an annular cross section with the outer cylindrical surface thereof in sliding and sealing engagement with valve bore 46 for reciprocation therein. Formed at the lower end of slide valve 78 is collar 82, connected to tubular portion 80 by an arrangement of radial spider arms 84. Collar 82 has an inner bore 86, FIG. 2, of slightly larger diameter than stem 68, so that valve member 78 "floats" axially relative to stem 68. Disposed around stem 68 between a collar 70 formed on the end of stem 68 and collar 82 is a first compression spring 88. A second compression spring 90 is disposed about the stem between collar 82 and the bottom of valve bore 46. When stem 68 is in its fully extended position into valve bore 46, springs 88 and 90 are each partially compressed or pre-loaded. It will be apparent that springs 88 and 90 are in effect in series relationship between collar 70 and the bottom of valve bore 46, with spring 88 exerting a downward force on collar 82 and spring 90 exerting an upward force on collar 82 to abuttingly support collar 82 therebetween. For various stroke positions of piston 66, collar 82 and in turn valve member 78, will be supported in the various positions in which the downward and upward forces are in balance. Springs 88 and 90 are of lower relative magnitude of stiffness in comparison to the heavier piston spring 76, and are so chosen that they permit resilient relative movement between valve member 78 and stem 68. Thus the arrangement of springs 88, 90 and collar 82 form a resiliently yieldable linkage interconnecting stem 68 and valve member 78 for transmitting the reciprocating motion of the former to the latter while permitting resilient relative movement between the stem and valve member.

In operation, fuel under pressure enters the lower end of valve bore 46 through the fuel passage 56 and flows up through the interior of tubular valve member 78. The slide valve action to meter flow of fuel is provided by movement of the upper end of valve member 78 across the shoulder 98 formed where valve bore 46 opens into head chamber 50. The upper end of tubular portion 80 of valve member 78 forms an annular valve face 92 which confronts an annular valve seat 96 formed on the lower end of boss 52. In the closed position of the valve, the valve face 92 seats against seat 96 to shut off all flow of fuel into the outlet passages. In positions in which the upper end of valve member 78 is intermediate shoulder 98 and the closed position, face 92 and seat 96 form opposed walls of an annular metering passage. The choice of areas provided by this annular metering passage, the stroke of piston 66 under various oxidant pressures, and the coupling of the motion of piston 66 to valve member 78 by the resilient linkage are such that the metering passage provides flow of fuel at a constant ratio relative to liquid oxidant delivered into the combustion chamber 16 through delivery line 26 at each position of piston 66 within its extremes of movement.

Tubular valve member 78, annular abutment 92, and springs 88 and 90, are constructed and arranged as described so that the valve will be in its closed position in absence of hydraulic pressure on face 72 of piston 66 of a predetermined minimum value. The heavy spring 76 acting against piston 66 is not a preloaded spring; that is to say, it is expanded to its full free length in absence of hydraulic pressure against face 72 of piston 66. Heavy spring 76 does not, therefore, operate to maintain the valve in its closed position. Instead, the compressive force of the preloaded springs 88 and 90, acting between collar 70 and the bottom of valve bore 46 maintain the valve closed in absence of hydraulic force against piston face 72. Thus in cracking the valve open, the hydraulic pressure against piston face 72 must first exceed the compressive force of the preloaded springs. Conversely, in shutting the valve the compressive force of the springs will close the valve as soon as the hydraulic pressure drops below the corresponding value. In this manner, the minimum value of hydraulic pressure to open the valve, or to maintain the valve opened, may be accurately predetermined by choice of the degree of preloading of springs 88 and 90. Since the hydraulic pressure is against piston 72 varies in accordance with the flow of oxidant through supply line 26 into combustion chamber, the described arrangement also automatically provides the desired oxidant lead in starting and oxidant override during shut down of the rocket motor unit.

The tubular valve member 78 and the resiliently yieldable linkage interconnecting stem 68 and valve member 78 are constructed and arranged as above described to provide negative feedback in order to eliminate or filter movement of valve member 78 in response to oscillations, or short, transient movements of piston 66 due to variations in control pressure. For example, when stem 68 is actuated in the downward direction to apply a downward force to valve member 78 and increase the flow of fuel, the resultant increase in dynamic pressure of the increased flow acts on the web area presented by the lower face of radial arms 84 and collar 82 of the valve member, providing an upwardly directed negative feedback force which tends to resist the downward movement of valve member 78. This has been shown by a feedback diagram 99, FIG. 3, in which arrow $F_1$ represents the force of stem 68; block 100 the dynamic response of the reilient linkage and valve member to forces applied thereto in changing the fuel flow rate Q; and block 101 the dynamic response of the web area to dynamic pressure to produce a negative feedback force $F_2$ acting on the valve member in the opposite direction (as symbolically represented by plus and minus signs) to force $F_1$. The stiffness and natural frequency of oscillation of springs 88 and 90 are so chosen relative to the negative feedback force of fluid acting on such areas of valve member 78 and the inertia of the valve member, that the resilient linkage eliminates or filters out short, transitory, or relatively high frequency movements of stem 68.

It will be apparent that any "cracking" or opening of valve member 78 from a closed position must be effected by downward force of stem 68 transmitted to collar 82 by the yielding pressure of spring 88. Thus, any force initially restraining of the valve toward its closed position by pressure of the valved liquid would be highly undesirable, because the valve would not crack open until spring 88 is sufficiently compressed to exert the force required to overcome such pressure force. Overcoming such restraining force would in many instances require undesired excessive control pressure against piston 66 to crack the valve, or could cause undesired oscillation of the springs after the restraining force is released. Accordingly, the tubular slide valve member 78, valve bore 46, and head chamber 50 are constructed and arranged as above described so that the valve is substantially pressure balanced when valve member 78 is in its closed position. In such closed position there is no fuel flow and therefore only static pressure forces acting on valve member 78. The components of force of such static pressure in the direction of reciprocation of valve member 78 are substantially counterbalanced. For example, the static pressure acts equally on both sides of the web area of radial arms 84 and collar 82 are therefore counterbalanced. The only unbalanced pressure acting against valve member 78 is the upward force against its annular lower face.

Fuel injector head 12 comprises a body 102 having formed therein a passageway 104 communicating fuel supply link 22 and outlet opening 14. In passageway 104 near outlet 14 is mounted a valve guide 106 in which can slide the stem of a poppet valve 108. Disposed between a collar 109 at the stem end of poppet valve 108, and the valve guide 106 is a compression spring 112 which serves to maintain poppet valve 108 seated in the closed position, shown. Compression spring 112 is of such low stiffness that any flow of fuel from fuel control valve 10 is sufficient to lift the poppet valve from its seat and overcome the force of the spring. Movement of poppet valve away from its seated position is limited by abutment of a collar 110 formed on the valve stem against the valve guide 106, which serves the define the full open position of the poppet. Thus, poppet valve 108 forms a normally opened or normally closed check valve which provides fixed ejection orifice area under any condition of fuel flow out of fuel control valve 10.

Obviously many modifications and variations of the present invention are possible in the light of the above teachings. It is therefore to be understood that within the scope of the appended claims the invention may be practiced otherwise than as specifically described.

What is claimed is:

1. Apparatus for use with a liquid bi-propellant rocket motor of the type having a combustion chamber to which oxidant and fuel are delivered and including an oxidant supply conduit in which pressure may vary, the improvements, comprising; a fuel metering valve including an axially movable annular member, one end of which defines one wall of a metering passage, the fuel adapted to flow through said member, said member being substantially pressure balanced, actuating means responsive to pressure of oxidant being supplied to the combustion chamber, resilient linkage means operatively connecting said actuating means and the valve member to move the latter in accordance with the former to open and maintain said valve member in a position of opening in response to said pressure of oxidant to meter the flow of fuel in accordance with said pressure of oxidant, said valve member including means forming a pressure web extending transversely across the interior of the annular member, said pressure web being subject to the force of the fuel flow through the annular member and cooperating with said resilient linkage to provide a negative feedback force acting upon said metering valve to maintain the metering passage wall at a desired position of opening irrespective of rapid transitory pressure fluctuations in said oxidant supply conduit.

2. Apparatus for metering the flow of a liquid, comprising;
   (a) a body member forming a cylindrical bore,
   (b) a movable liquid metering valve including an annular member slidingly disposed in said bore, the liquid adapted to flow through the interior of said annular member,
   (c) an outlet port formed in said body member adjacent the downstream end of said annular member,
   (d) the downstream end of said annular member and the outlet port cooperating to form a variable size metering passage that increases in size under movement of the annular member in the downstream direction,
   (e) valve actuating means and a resilient linkage connecting same and the annular member to vary the flow of the liquid through said outlet,
   (f) said metering valve including means forming a pressure web extending transversely across the interior of the annular element,
      said pressure web being subject to the force of the liquid flowing through the annular member and cooperating with said resilient linkage to provide a negative feedback force acting upon said metering valve tending to resist rapid transitory movements.

3. Apparatus in accordance with claim 2, said valve actuating means and resilient linkage comprising,
   (g) an axially movable rod extending into the interior of the annular member and through an opening in the web area member, and
   (h) a first helical compression spring disposed about the rod having one of its ends in abutting engagement with an abutment on the end of the rod and the other of its ends with the confronting side of said pressure web, and a second helical compression spring disposed about the rod with one of its ends in abutting engagement with the other side of said pressure web and the other of its ends with a stationary portion of the apparatus.

4. Apparatus in accordance with claim 2,
   (i) said upstream end of the annular member forming an annular end face, and
   (j) an annular valve seat for receiving said end face in the closed position of said metering valve,
      whereby said metering valve is substantially pressure balanced when in the closed position.

References Cited by the Examiner
UNITED STATES PATENTS 2,816,417  12/57  Bloomberg.
3,018,797  1/62   Parks _____ 251—77 X ISADOR WEIL, *Primary Examiner.*
JULIUS E. WEST, *Examiner.*